UNITED STATES PATENT OFFICE.

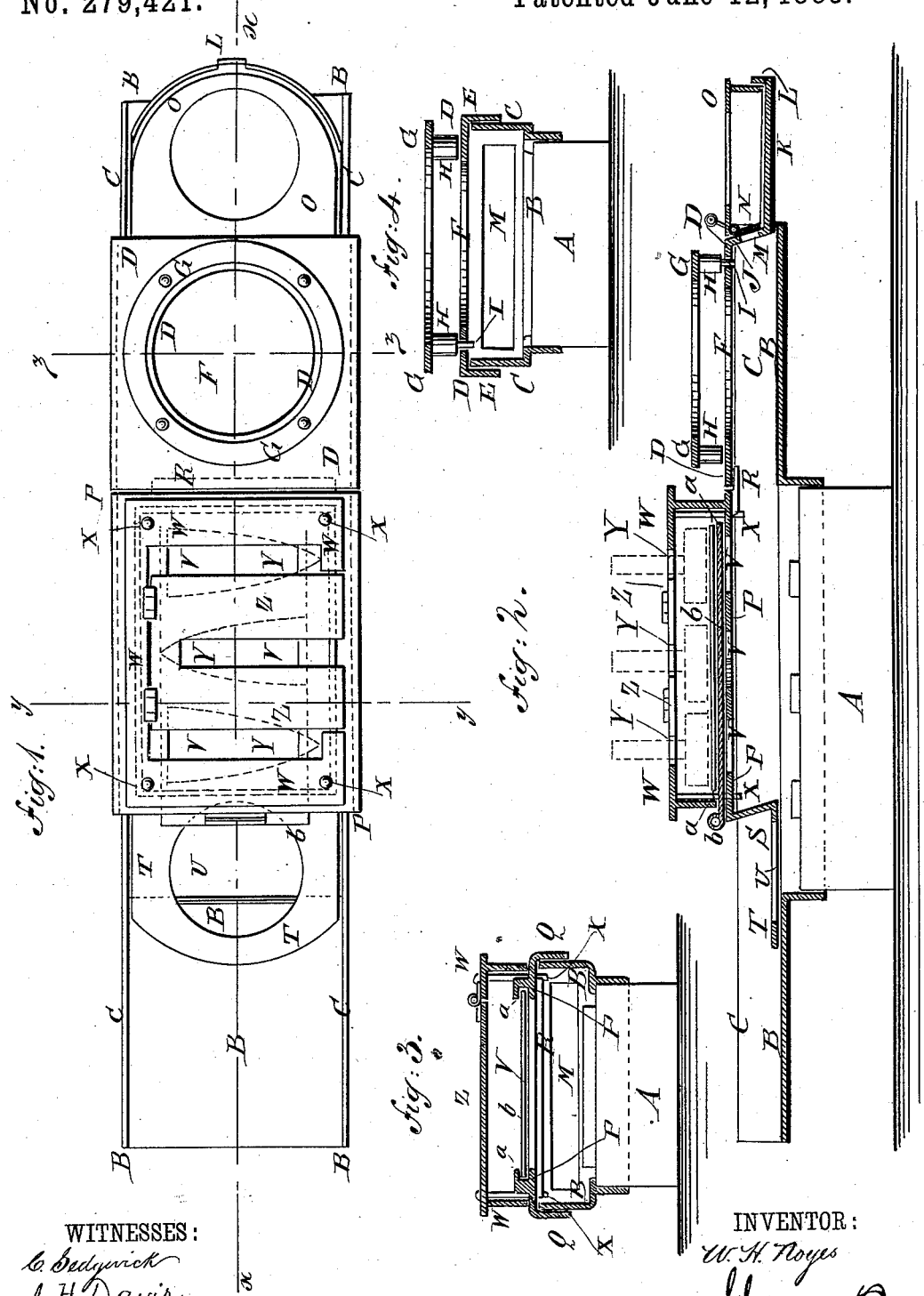

WILLIAM H. NOYES, OF NEWBURYPORT, MASSACHUSETTS.

TOP-COVER FOR KEROSENE, GAS, AND OTHER STOVES.

SPECIFICATION forming part of Letters Patent No. 279,421, dated June 12, 1883.

Application filed March 9, 1883. (No model.)

*To all whom it may concern:*

Be it known that I, WILLIAM HENRY NOYES, of Newburyport, in the county of Essex and State of Massachusetts, have invented certain new and useful Improvements in Top-Covers for Kerosene, Gas, and other Stoves, of which the following is a full, clear, and exact description.

Reference is to be had to the accompanying drawings, forming part of this specification, in which similar letters of reference indicate corresponding parts in all the figures.

Figure 1 is a plan view of my improvement. Fig. 2 is a sectional side elevation of the same, taken through the line $x\,x$, Fig. 1. Fig. 3 is a sectional end elevation of the same, taken through the line $y\,y$, Fig. 1. Fig. 4 is a sectional end elevation of the same, taken through the line $z\,z$, Fig. 1.

The object of this invention is to facilitate the operation of cooking and heating sad-irons on kerosene, gas, and other stoves.

The invention consists of the several combinations and arrangements of parts, substantially as hereinafter fully set forth and claimed.

The cover is made with an outwardly and downwardly inclined apertured shoulder and a horizontal plate, and the shoulder is provided with a damper and the plate with an apertured box, so that heat can be admitted to and shut off from the said box and a vessel placed upon it, as may be required. The stove-top is provided with a second apertured cover to receive sad-irons, and a box to inclose the sad-irons and confine the heat about them. In the lower part of the box is placed a sliding plate to shut off the heat from any or all the sad-irons, as may be required. The middle part of the top of the box is separate, and is hinged to the stationary part to allow the sad-irons to be readily put in and taken out. The outer part of the sad-iron-receiving cover is made with a downwardly and inwardly inclined shoulder and an apertured horizontal plate to allow wide-bottomed vessels to be placed upon the said apertured plate. Upon the inner end of the sad-iron-receiving cover is formed a flange which is depressed or made with a downward offset to adapt it to pass in beneath the inner end of the other cover to close the joint between the said covers and prevent the escape of heat, as will be hereinafter fully described.

A represents the body of the stove, which is provided with a top, B, extending outward upon both sides, as shown in Fig. 2, and has upwardly-projecting flanges C upon its front and rear edges, to form the combustion-chamber and to serve as a support for the covers.

D is a cover which rests and slides upon the edges of the flanges C, and has downwardly-projecting flanges E upon its front and rear edges, to overlap the flanges C and keep the said cover in place.

In the cover D is formed a hole, F, to allow the products of combustion to come into direct contact with the bottom of the vessel containing the substance to be heated.

Above the cover D is placed a ring, G, the aperture of which is a little larger than the aperture F, and which is supported by short legs H, resting upon the said cover D. Two or more of the legs H have pins or tenons I formed upon or attached to their lower ends, and which enter small holes in the cover D, to keep the ring G securely in place when in use. The ring G, when not in use, can be lifted off and laid aside. The outer part of the cover D is inclined downward and outward, forming a shoulder, J, and at the top B extends outward horizontally, as shown at K in Fig. 2, and has an upwardly-projecting point, L, upon its outer edge, to hold the box O in place.

In the shoulder J is formed an oblong aperture, M, which is closed by a damper, N, resting upon the inclined outer surface of the shoulder J, and kept in place by its own weight.

Upon the lower horizontal part K of the cover D is secured a box, O, having an aperture in its top. The box O may be used for warming plates and other articles, and by opening the damper N the said box can be used for heating and cooking the contents of a vessel placed upon it.

P is a cover which rests and slides upon the edges of the flanges C, and has downwardly-projecting flanges Q upon its front and rear edges, to overlap the outer sides of the said flanges C and keep the said cover in place. The inner end of the cover P has a slight downward offset formed in it, to form a flange, R, which, when the covers D P are slid together, passes beneath the inner end of the cover D, and thus closes the joint between the said covers against the escape through it of any of the products of combustion. The outer end of the cover P is bent downward and inward, forming an inwardly-inclined shoulder, S, and is then bent outward to rest upon the stove-top B, as shown at T in Figs. 1 and 2.

In the lower horizontal part T of the cover P is formed a hole, U, to give the products of combustion access to the bottom of a vessel placed upon the said part T. The inward inclination of the shoulder S allows coffee-pots and other wide-bottomed vessels to be conveniently placed upon the lower horizontal part T.

In the upper horizontal part of the cover P are formed three (more or less) apertures, V, which may be made wider at one end than at the other, in the shape of a sad-iron, and are arranged with their wide and narrow ends at the opposite sides of the said cover alternately, as indicated in dotted lines in Fig. 1.

Upon the upper horizontal part of the cover P is placed a box, W, made with an open bottom, and with points X at its corners, to enter holes in the said cover P, and thus keep the said box in place upon the said cover. In the top of the box W, directly over the central lines of the apertures V, are formed slots Y, to receive the handles of the sad-irons, as indicated in dotted lines in Fig. 2. The part Z of the top of the box W, between the side slots, Y, is made separate, and is hinged at one end to the rear part of the said top, so that it can be conveniently put in and taken out.

In the lower part of the sides of the box W are formed grooves $a$, in which slide the edges of the plate $b$, which can thus be pushed in beneath one or more of the sad-irons, so that one, all, or any number of the sad-irons can be heated at a time, as may be desired.

The covers D P may be moved together upon the flanges C to the position shown in Fig. 2, so as to admit heat through the aperture U of the plate T; or the covers D P can be arranged to close the aperture U by moving them together to the left from the position shown in Fig. 2, for bringing the aperture F directly over the stove-top.

Having thus described my invention, what I claim as new, and desire to secure by Letters Patent, is—

1. In top-covers for stoves, the apertured plates, one having an apertured extension connected to its plate by an inclined step or shoulder, the apertures of the stepped plate adapted to conform to the shape of a sad-iron, substantially as described.

2. In top-covers for stoves, the combination, with the cover D, having outwardly and downwardly inclined apertured shoulder J and horizontal plate K, of the damper N and apertured box O, substantially as herein shown and described, whereby heat can be admitted to and shut off from the said box and a vessel placed upon it, as may be required.

3. In top-covers for stoves, the combination, with the flanged top, of the apertured covering-plates, one having an inclined stepped extension and the other having a downwardly-extended flange, substantially as and for the purpose set forth.

4. In top-covers for stoves, the combination, with the flanged top, of the apertured covering-plates, one having a stepped extension connected to its plate by an inclined shoulder, and the other having also a stepped extension connected to its plate by an apertured shoulder, and the apertured box, substantially as and for the purpose set forth.

5. In top-covers for stoves, the cover P, made substantially as herein shown and described, with a downwardly and inwardly inclined shoulder, S, and an apertured horizontal plate, T, whereby wide-bottomed vessels can be placed upon the said plate, as set forth.

WILLIAM HENRY NOYES.

Witnesses:
JOHN J. NOYES,
EDWARD F. BARTLETT.